(12) United States Patent
Ogawa et al.

(10) Patent No.: US 12,398,230 B2
(45) Date of Patent: Aug. 26, 2025

(54) CURING RESIN COMPOSITION, CURING METHOD THEREFOR, AND MOLDED ARTICLE

(71) Applicant: MITSUBISHI GAS CHEMICAL COMPANY, INC., Tokyo (JP)

(72) Inventors: Noriyoshi Ogawa, Ibaraki (JP); Shun Ishikawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 705 days.

(21) Appl. No.: 17/770,151

(22) PCT Filed: Oct. 21, 2020

(86) PCT No.: PCT/JP2020/039477
§ 371 (c)(1),
(2) Date: Apr. 19, 2022

(87) PCT Pub. No.: WO2021/079893
PCT Pub. Date: Apr. 29, 2021

(65) Prior Publication Data
US 2022/0389144 A1    Dec. 8, 2022

(30) Foreign Application Priority Data

Oct. 23, 2019  (JP) ................................ 2019-192799

(51) Int. Cl.
C08F 290/06 (2006.01)
C08G 64/04 (2006.01)
C08L 33/12 (2006.01)

(52) U.S. Cl.
CPC ........ *C08F 290/061* (2013.01); *C08G 64/045* (2013.01); *C08L 33/12* (2013.01); *C08F 2810/40* (2013.01); *C08L 2201/10* (2013.01); *C08L 2203/30* (2013.01)

(58) Field of Classification Search
None
See application file for complete search history.

(56) References Cited

U.S. PATENT DOCUMENTS

| 5,426,159 A | 6/1995 | Umemura |
| 6,043,334 A * | 3/2000 | Kanamaru ............. C08G 64/12 430/58.35 |

| 8,975,336 B2 | 3/2015 | Shimizu et al. |
| 2011/0282006 A1 | 11/2011 | Shimizu et al. |
| 2019/0033734 A1 | 1/2019 | Yoshizawa |
| 2020/0317863 A1 | 10/2020 | Ogawa |

FOREIGN PATENT DOCUMENTS

| JP | 48-25076 B | 7/1973 |
| JP | 63-3023 A | 1/1988 |
| JP | 63-125522 A | 5/1988 |
| JP | 5-65320 A | 3/1993 |
| JP | 6-41258 A | 2/1994 |
| JP | 6-184294 A | 7/1994 |
| JP | 6-279705 | 10/1994 |
| JP | 2000-230043 A | 8/2000 |
| JP | 2002-256039 A | 9/2002 |
| JP | 2008-101191 A | 5/2008 |
| JP | 2009-527003 A | 7/2009 |
| JP | 5697143 B2 | 4/2015 |
| JP | 2016-160291 A | 9/2016 |
| WO | 2008-108173 A1 | 9/2008 |
| WO | 2010/061872 A1 | 6/2010 |
| WO | 2017-154901 A1 | 9/2017 |
| WO | 2017/170613 A1 | 10/2017 |
| WO | 2019/124232 A1 | 6/2019 |
| WO | 2020/203958 A1 | 10/2020 |

OTHER PUBLICATIONS

Office Action dated Jul. 5, 2024 in Japanese family member Application No. 2021-553476 with English language translation thereof.
Office Action issued Aug. 24, 2023 in family member Chinese Patent Application No. 202080069285.8.
International Search Report and Written Opinion of the International Searching Authority issued in International Patent Application No. PCT/JP2020/039477, dated Dec. 22, 2020, along with an English translation thereof.

* cited by examiner

*Primary Examiner* — Robert S Jones, Jr.
*Assistant Examiner* — Lily K Sloan
(74) *Attorney, Agent, or Firm* — GREENBLUM & BERNSTEIN P.L.C.

(57) ABSTRACT

Provided is a curable resin composition which can be molded by casting to obtain composite materials each composed of a polycarbonate resin and an acrylic resin and having high transparency and high impact strength. More specifically, provided is a curing resin composition comprising an acrylic monomer having a saturated group, a polycarbonate resin having an unsaturated-group-containing terminal structure at a molecular end, and a free-radical polymerization initiator.

14 Claims, No Drawings

CURING RESIN COMPOSITION, CURING METHOD THEREFOR, AND MOLDED ARTICLE

FIELD OF THE INVENTION

The present invention relates to a curable resin composition which can form a composite material of a polycarbonate resin and an acrylic resin, and to a cast molded article obtained by curing said composition.

BACKGROUND ART

Acrylic resins mainly composed of methyl methacrylate are widely applicable, for example, to resin windows, lenses, light guide plates and the like for their excellent transparency and hardness. Acrylic resins, however, are disadvantageous in that they have low impact resistance and thus in that they are fragile.

Accordingly, attempts have been made to prepare a polymer alloy of a polycarbonate resin having excellent impact resistance and an acrylic resin. As a method for homogeneously blending a polycarbonate resin and an acrylic resin while maintaining transparency, a method of melt kneading these materials at a high shear rate until they are dispersed in nano-level is known (Patent literature 1). Alternatively, a method employing solution polymerization in which an acrylic monomer and a polycarbonate having an unsaturated group are dissolved in a dichloromethane solvent to form a copolymer (Patent literature 2), and methods employing suspension polymerization in which a solid polycarbonate having an unsaturated group is dispersed in water to allow an acrylic monomer to adsorb to the polycarbonate (Patent literatures 3 and 4) are known.

According to these methods, however, the polycarbonate resin is not completely blended with the acrylic monomer, and thus the resultant is difficult to be molded by a casting process that is generally employed for acrylic resins. Therefore, there is still room for improvement.

PRIOR ART LITERATURES

Patent Literatures

Patent literature 1: WO2010/061872 (Japanese Patent No. 5697143)
Patent literature 2: Japanese Examined Patent Application Publication No. S48-025076
Patent literature 3: Japanese Unexamined Patent Application Publication No. H05-65320
Patent literature 4: Japanese Unexamined Patent Application Publication No. H06-041258

SUMMARY OF INVENTION

Problem to be Solved by Invention

The present invention provides a curable resin composition that can be cast molded to obtain a composite material of a polycarbonate resin and an acrylic resin which has excellent transparency and high impact strength.

Means for Solving the Problem

In order to solve the conventional problems, the present inventors have conducted diligent research, and as a result of which found that a polycarbonate resin which has a specific main backbone with an unsaturated group at the end of the molecule can dissolve well in an acrylic monomer and can be used to obtain a curable resin solution composition that is favorable to be cast molded to obtain a composite material of a polycarbonate resin and an acrylic resin having excellent transparency and high impact strength, thereby accomplishing the present invention. Thus, the present invention comprises the following aspects.

[1] A curable resin composition comprising:
an acrylic monomer having a saturated group;
a polycarbonate resin containing Structural unit (2) below which has a terminal structure represented by Structural formula (1) below with an unsaturated group attached to the end of the molecule; and
a radical polymerization initiator:

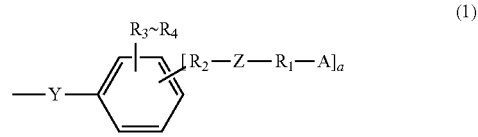

(in Formula (1),
A represents a vinyl group, an isopropenyl group, a styryl group or a methine group,
$R_1$-$R_2$ each independently represent a single bond or an optionally substituted C1-C20 alkylene group,
$R_3$-$R_4$ each independently represent hydrogen, or an optionally substituted C1-C20 alkyl group, C1-C10 alkoxy group, C6-C12 aryl group or benzotriazole group,
Z represents an ether group, a carbonyl group, an ester group or a single bond,
a is an integer of 1-3, and
Y represents an ether bond or an ester group); and

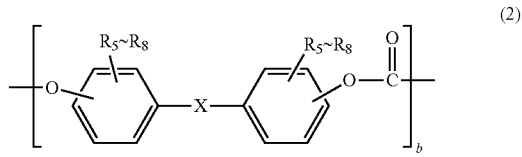

(in Formula (2),
$R_5$-$R_8$ each independently represent hydrogen, or an optionally substituted C1-C20 alkyl group, C6-C12 aryl group, C1-C5 alkoxy group or C7-C17 aralkyl group,
b is an integer of 1 or greater,
X is as follows:

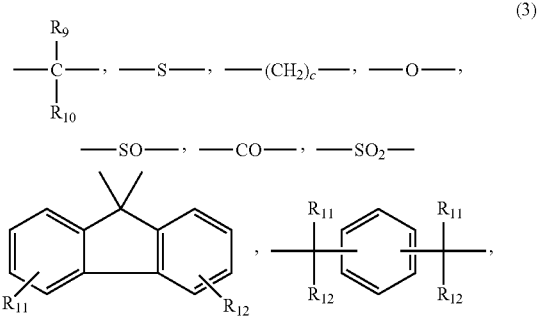

-continued

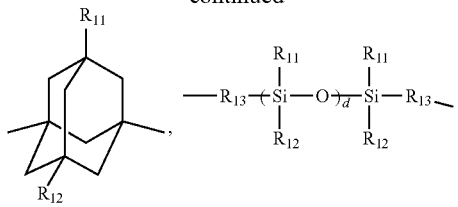

wherein,
$R_9$ and $R_{10}$ each independently represent hydrogen, fluorine, chlorine, bromine or iodine, or an optionally substituted C1-C20 alkyl group, C1-C5 alkoxy group or C6-C12 aryl group, or $R_9$ and $R_{10}$ bind to each other and represent a group forming a C5-C20 carbocyclic ring or a heterocyclic ring having 5-12 elements,
$R_{11}$ and $R_{12}$ each independently represent hydrogen, fluorine, chlorine, bromine or iodine, or an optionally substituted C1-C9 alkyl group, C1-C5 alkoxy group or C6-C12 aryl group,
$R_{13}$ is an optionally substituted C1-C9 alkylene group,
c represents an integer of 0-20, and
d represents an integer of 1-500,
provided that the composition further comprises a second polycarbonate resin if $R_5$-$R_8$ are hydrogen and $R_9$ and $R_{10}$ are methyl groups).

[2] The curable resin composition according to [1] above, wherein Structural unit (2) is any one or more kinds selected from the group consisting of Formulae (4) to (7) below:

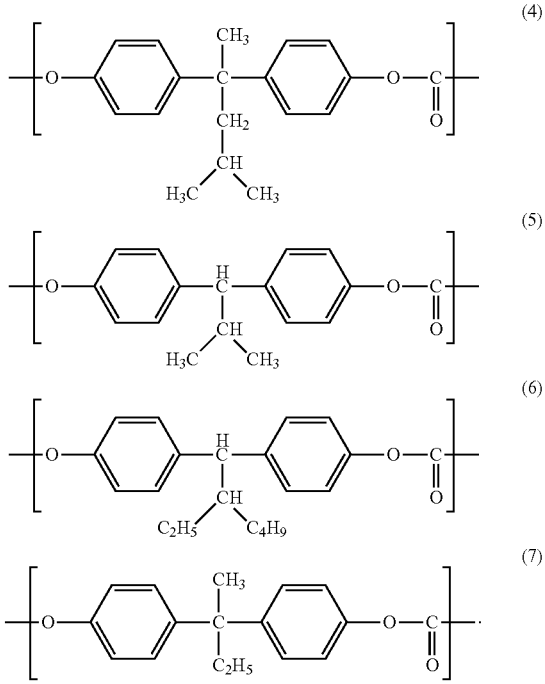

[3] The curable resin composition according to [1] above, wherein Structural unit (2) is derived from a bisphenol compound.

[4] The curable resin composition according to [3] above, wherein at least one kind of bisphenol compound is selected from the group consisting of 2,2-bis(4-hydroxyphenyl)butane, 1,1-bis(4-hydroxyphenyl)-2-methylpropane, 1,1-bis(4-hydroxyphenyl)-2-ethylhexane and 2,2-bis(4-hydroxyphenyl)-4-methylpentane.

[5] The curable resin composition according to any one of [1] to [4] above, wherein, in Formula (1) above, Z is a single bond or an ester group, $R_1$-$R_2$ are each independently a single bond or an ethylene group, A is an isopropenyl group or a methine group, and $R_3$-$R_4$ are each independently hydrogen or a benzotriazole group.

[6] The curable resin composition according to [5] above, wherein the terminal structure represented by Formula (1) above is a monohydric phenol derived from 2-[2-hydroxy-5-[2-(methacryloyloxy)ethyl]phenyl]-2H-benzotriazole or p-isopropenylphenol.

[7] The curable resin composition according to any one of [1] to [6] above, wherein the acrylic monomer comprises an acrylate ester or a methacrylate ester.

[8] The curable resin composition according to any one of [1] to [7] above, wherein the acrylic monomer comprises a methyl methacrylate.

[9] The curable resin composition according to any one of [1] to [8] above, wherein the polycarbonate resin has an intrinsic viscosity of 0.3-2.0 dl/g.

[10] The curable resin composition according to any one of [1] to [9] above, comprising the terminal structure represented by Structural formula (1) in an amount of 0.2 mol % or more relative to the amount of Structural unit (2) above.

[11] A curing method comprising curing the curable resin composition according to any one of [1] to [10] above by applying heat or light thereto.

[12] A cast molded article put and cured in a mold by the curing method according to [11] above.

[13] A method for producing a cast molded article, the method comprising putting and curing the curable resin composition according to any one of [1] to [10] above in a mold.

[14] A cast molded article, which is formed of the curable resin composition according to any one of [1] to [10] above.

Effects of Invention

A curable resin composition of the present invention can be cured through the reaction between a polycarbonate resin and an acrylic monomer without a solvent, and can be used to form a composite material of the polycarbonate resin and the acrylic resin, which has excellent transparency and impact strength, by a casting process.

MODE FOR CARRYING OUT INVENTION

1. Curable Resin Composition

A curable resin composition of the present invention comprises:
an acrylic monomer having a saturated group;
a polycarbonate resin containing Structural unit (2) below which has a terminal structure represented by Structural formula (1) below with an unsaturated group attached to the end of the molecule; and
a radical polymerization initiator:

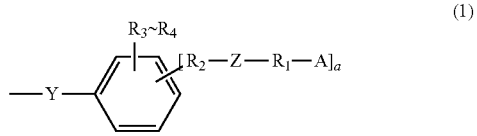

(in Formula (1),

A represents a vinyl group, an isopropenyl group, a styryl group or a methine group, $R_1$-$R_2$ each independently represent a single bond or an optionally substituted C1-C20 alkylene group, $R_3$-$R_4$ each independently represent hydrogen, or an optionally substituted C1-C20 alkyl group, C1-C10 alkoxy group, C6-C12 aryl group or benzotriazole group, Z represents an ether group, a carbonyl group, an ester group or a single bond, a is an integer of 1-3, and Y represents an ether bond or an ester group); and

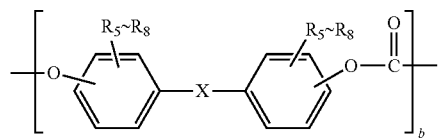

(in Formula (2), $R_5$-$R_8$ each independently represent hydrogen, or an optionally substituted C1-C20 alkyl group, C6-C12 aryl group, C1-C5 alkoxy group or C7-C17 aralkyl group, b is an integer of 1 or greater, X is as follows:

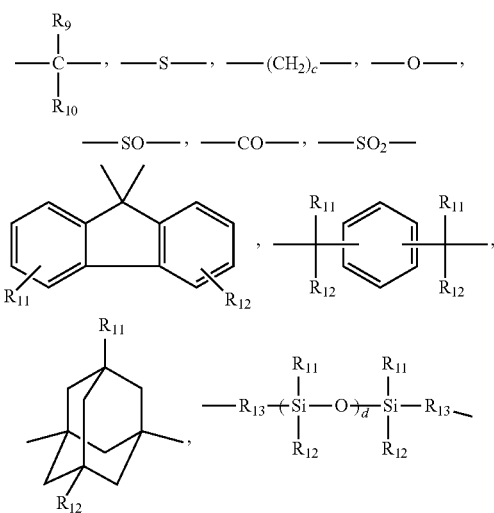

wherein, $R_9$ and $R_{10}$ each independently represent hydrogen, fluorine, chlorine, bromine or iodine, or an optionally substituted C1-C20 alkyl group, C1-C5 alkoxy group or C6-C12 aryl group, or $R_9$ and $R_{10}$ bind to each other and represent a group forming a C5-C20 carbocyclic ring or a heterocyclic ring having 5-12 elements, $R_{11}$ and $R_{12}$ each independently represent hydrogen, fluorine, chlorine, bromine or iodine, or an optionally substituted C1-C9 alkyl group, C1-C5 alkoxy group or C6-C12 aryl group, $R_{13}$ is an optionally substituted C1-C9 alkylene group, c represents an integer of 0-20, and d represents an integer of 1-500, provided that the composition further comprises a second polycarbonate resin if $R_5$-$R_8$ are hydrogen and $R_9$ and $R_{10}$ are methyl groups).

In a preferred embodiment of the present invention, the curable resin composition of the present invention may be a solvent-free curable resin composition comprising:

an acrylic monomer having a saturated group;

a polycarbonate resin containing Structural unit (2) above which has a terminal structure represented by Structural formula (1) above with an unsaturated group attached to the end of the molecule; and a radical polymerization initiator.

<Polycarbonate Resin Comprising Structural Unit (2) Having Terminal Structure Represented by Structural Formula (1) Above with Unsaturated Group Attached to the End of the Molecule>

A polycarbonate resin used for the curable resin composition of the present invention can be produced by allowing reaction of a monohydric phenol that results Structural formula (1) at the end of the molecule, a bisphenol that results Structural unit (2), and a carbonate ester-forming compound. The polycarbonate resin used for the curable resin composition of the present invention can be produced by employing a known method for producing a polycarbonate from bisphenol A, for example, direct reaction between a bisphenol and phosgene (phosgene method), or transesterification between a bisphenol and bisaryl carbonate (transesterification method).

<Bisphenol that Results Structural Unit (2)>

A bisphenol that results Structural unit (2), i.e., a constituent monomer of the polycarbonate resin of the present invention, is represented by Structural formula (8) below.

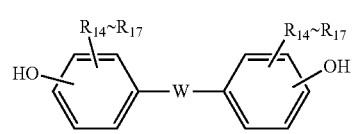

(wherein, $R_{14}$-$R_{17}$ each independently represent hydrogen, or an optionally substituted C1-C20 alkyl group, C6-C12 aryl group, C2-C12 alkenyl group, C1-C5 alkoxy group or C7-C17 aralkyl group, and W is as follows:

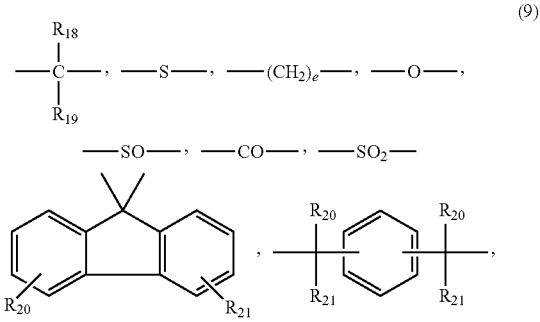

-continued

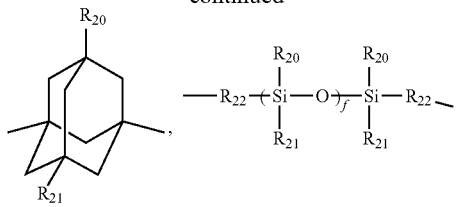

wherein, $R_{18}$ and $R_{19}$ each independently represent hydrogen, fluorine, chlorine, bromine or iodine, or an optionally substituted C1-C20 alkyl group, C1-C5 alkoxy group or C6-C12 aryl group, or $R_{18}$ and $R_{19}$ bind to each other and represent a group forming a C5-C20 carbocyclic ring or a heterocyclic ring having 5-12 elements, $R_{20}$ and $R_{21}$ each independently represent hydrogen, fluorine, chlorine, bromine or iodine, or an optionally substituted C1-C9 alkyl group, C1-C5 alkoxy group, C2-C12 alkenyl group or C6-C12 aryl group, $R_{22}$ is an optionally substituted C1-C9 alkylene group, e represents an integer of 0-20, and f represents an integer of 1-500, provided that the composition further comprises a second polycarbonate resin if $R_{14}$-$R_{17}$ are hydrogen and $R_{18}$ and $R_{19}$ are methyl groups).

The constituent monomer of the polycarbonate resin of the present invention is preferably represented by Structural formula (8), wherein:

$R_{14}$-$R_{17}$ may each independently represent hydrogen, or an optionally substituted C1-C6 alkyl group, C6 aryl group, C2-C6 alkenyl group, C1-C5 alkoxy group or C7-C17 aralkyl group;

$R_{18}$ and $R_{19}$ may each independently represent hydrogen or fluorine, or an optionally substituted C1-C12 alkyl group, C1-C5 alkoxy group or C6-C12 aryl group, or $R_{18}$ and $R_{19}$ may bind to each other and represent a group forming a C5-C20 carbocyclic ring or a heterocyclic ring having 5-12 elements;

$R_{20}$ and $R_{21}$ may each independently represent hydrogen or fluorine, or an optionally substituted C1-C6 alkyl group, C1-C5 alkoxy group, C2-C6 alkenyl group or C6-C12 aryl group; and $R_{22}$ may be an optionally substituted 1-6 alkylene group.

Specific examples of the constituent monomer of the polycarbonate resin of the present invention include, but not limited to, 4,4'-dihydroxybiphenyl, bis(4-hydroxyphenyl)methane, bis(2-hydroxyphenyl)methane, 2,4'-dihydroxydiphenyl methane, bis(4-hydroxyphenyl)ether, bis(4-hydroxyphenyl)sulfone, 2,4'-dihydroxydiphenyl sulfone, bis(2-hydroxyphenyl)sulfone, bis(4-hydroxy-3-methylphenyl)sulfone, bis(4-hydroxyphenyl)sulfoxide, bis(4-hydroxyphenyl) sulfide, bis(4-hydroxyphenyl)ketone, 1,1-bis(4-hydroxyphenyl)ethane, 1,1-bis(4-hydroxyphenyl)-1-phenylethane, bis(4-hydroxyphenyl)diphenylmethane, 2,2-bis(4-hydroxyphenyl)propane, 2,2-bis(4-hydroxy-3-methylphenyl)propane, 1,1-bis(4-hydroxy-3-methylphenyl)ethane, bis(4-hydroxy-3-methylphenyl)methane, 2,2-bis(4-hydroxy-3-t-butylphenyl)propane, 2,2-bis(4-hydroxyphenyl)butane, 1,1-bis(4-hydroxyphenyl)-2-methylpropane, 1,1-bis(4-hydroxyphenyl)-2-ethylhexane, 2,2-bis(4-hydroxyphenyl)-4-methylpentane, 1,1-bis(4-hydroxyphenyl)decane, 1,3-bis(4-hydroxyphenyl)-5,7-dimethyladamantane, 1,1-bis(4-hydroxyphenyl)cyclohexane, 1,1-bis(4-hydroxy-3-methylphenyl)cyclohexane, 1,1-bis(4-hydroxyphenyl)cycloundecane, 1,1-bis(4-hydroxyphenyl)cyclododecane, 3,3,5-trimethyl-1,1-bis(4-hydroxyphenyl)cyclohexane, 9,9-bis(4-hydroxy-3-ethylphenyl)fluorene, 9,9-bis(4-hydroxy-3-methylphenyl)fluorene, 9,9-bis(4-hydroxyphenyl)fluorene, α,ω-bis[3-(o-hydroxyphenyl)propyl] polydimethyl diphenyl random copolymer siloxane, α,ω-bis[3-(o-hydroxyphenyl)propyl]polydimethyl siloxane, 4,4'-[1,4-phenylene bis(1-methylethylidene)]bisphenol and 4,4'-[1,3-phenylene bis(1-methylethylidene)]bisphenol. One or more kinds of these bisphenols can be used alone or in combination. Among these bisphenols, 2,2-bis(4-hydroxyphenyl)butane, 1,1-bis(4-hydroxyphenyl)-2-methylpropane, 1,1-bis(4-hydroxyphenyl)-2-ethylhexane and 2,2-bis(4-hydroxyphenyl)-4-methylpentane are particularly favorable to be used as the main component. More preferably, 2,2-bis(4-hydroxyphenyl)-4-methylpentane is used as the main component. Since 2,2-bis(4-hydroxyphenyl)propane is poorly soluble in an acrylic monomer when used alone, 2,2-bis(4-hydroxyphenyl)propane is not used by itself in the present invention.

<Monohydric Phenol that Results Structural Formula (1)>

A monohydric phenol that results Structural formula (1) at the end of the molecule is represented by Structural formula (10) below.

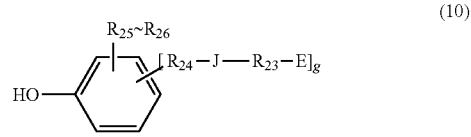

(10)

In Formula (10),

E represents a vinyl group, an isopropenyl group, a styryl group or a methine group, $R_{23}$-$R_{24}$ each independently represent a single bond or an optionally substituted C1-C20 alkylene group, $R_{25}$-$R_{26}$ each independently represent hydrogen, or an optionally substituted C1-C20 alkyl group, C1-C10 alkoxy group, C6-C12 aryl group or benzotriazole group, J represents an ether group, a carbonyl group, an ester group or a single bond, and g is an integer of 1-3.

In Structural formula (10) of one preferred embodiment of the present invention, J is a single bond, an ether group or an ester group, $R_{23}$-$R_{24}$ are each independently a single bond or an optionally substituted C1-C10 alkylene group, E is a vinyl group, an isopropenyl group or a methine group, $R_{25}$-$R_{26}$ are each independently hydrogen, a methoxy group, or an optionally substituted C1-C4 alkyl group or benzotriazole group. More preferably, J is a single bond or an ester group, $R_{23}$-$R_{24}$ are each independently a single bond or an ethylene group, E is an isopropenyl group or a methine group, and $R_{25}$-$R_{26}$ are each independently hydrogen or a benzotriazole group.

Specific examples of the monohydric phenol represented by Structural formula (10) include, but not limited to, styrene derivatives such as p-hydroxystyrene and p-isopropenylphenol, allylphenol derivatives such as o-allylphenol and eugenol, methacrylic derivatives such as 4-hydroxyphenyl methacrylate, 2-[2-hydroxy-5-[2-(methacryloyloxy)ethyl]phenyl]-2H-benzotriazole, 4-hydroxyphenylbutyl acrylate and 2-phenylphenolethyl acrylate, and methine derivatives such as 4-ethynylphenol and 4-propargylphenol. One or more kinds of these monohydric phenols may be used alone or in combination. Among others, the monohydric phenol represented by Structural formula (10) is preferably p-isopropenylphenol or 2-[2-hydroxy-5-[2-(methacryloyloxy)ethyl]phenyl]-2H-benzotriazole, and more preferably 2-[2-hydroxy-5-[2-(methacryloyloxy)ethyl]phenyl]-2H-benzotriazole.

The amount of the monohydric phenol represented by Structural formula (10) used may be 0.2 mol or more, preferably in a range of 0.2-20 mol, more preferably in a range of 0.5-10 mol, and still more preferably 1-7 mol, relative to 100 mol of the total bisphenol.

<Polycarbonate Resin and Method for Producing the Same>

According to a phosgene method, the bisphenol represented by Structural formula (8) above, the monohydric phenol represented by Structural formula (10) above and phosgene are allowed to react typically in the presence of an acid binding agent and a solvent. The acid binding agent may be, for example, pyridine or a hydroxide of an alkali metal such as sodium hydroxide or potassium hydroxide while the solvent may be, for example, methylene chloride or chloroform. Moreover, in order to promote the polycondensation reaction, a catalyst, for example, a tertiary amine such as triethylamine or a quaternary ammonium salt such as benzyltriethylammonium chloride, is preferably used. While the monohydric phenol represented by Structural formula (10) serves as an agent for adjusting the degree of polymerization, an additional monohydric phenol such as phenol, p-t-butylphenol, p-cumylphenol or a long-chain alkyl-substituted phenol can also be used in combination in an amount of less than 50 mass % relative to the amount of the monohydric phenol represented by Structural formula (10). In addition, an antioxidant such as sodium sulfite or hydrosulfite, a branching agent such as phloroglucin or isatin bisphenol, or the like can also be added in a small amount, as necessary. The reaction is suitably carried out usually at a temperature in a range of 0-150° C., and preferably at a temperature in a range of 5-40° C. While the reaction time varies depending on the reaction temperature, it is usually 0.5 minutes to 10 hours, and preferably 1 minute to 2 hours. Moreover, pH of the reaction system is preferably maintained at 10 or higher during the reaction.

Alternatively, according to a transesterification method, the bisphenol represented by Structural formula (8), the monohydric phenol represented by Structural formula (10) and a bisaryl carbonate are mixed and allowed to react at an elevated temperature under reduced pressure. Examples of the bisaryl carbonate include bisaryl carbonates such as diphenyl carbonate, di-p-tolyl carbonate, phenyl-p-tolyl carbonate, di-p-chlorophenyl carbonate and dinaphthyl carbonate. One or more kinds of these compounds may be used alone or in combination. The reaction takes place usually at a temperature in a range of 150-350° C. and preferably in a range of 200-300° C., while the pressure is reduced to a final pressure of preferably 1 mmHg or lower so that the phenol resulting from the bisaryl carbonate generated by the transesterification reaction is distilled away from the system. While the reaction time varies depending on the reaction temperature, the degree of pressure reduction and else, it is usually about 1-24 hours. The reaction is preferably carried out in an inert gas atmosphere such as nitrogen or argon. As necessary, a molecular weight modifier other than the monohydric phenol represented by Structural formula (10) can also be used in combination in a small amount, and an antioxidant and a branching agent can be added to carry out the reaction.

The polycarbonate resin contained in the curable resin composition of the present invention preferably has solubility/compatibility in/with an acrylic monomer, transparency and mechanical strength, which are necessary for the curable resin composition and the cured article thereof, in a favorable balance. If the intrinsic viscosity of the resin is too low, the mechanical strength will be poor, whereas if the intrinsic viscosity is too high, the solubility in an acrylic monomer will be poor and the viscosity of the resin composition will be high, which could deteriorate the handling property upon cast molding. The intrinsic viscosity is preferably in a range of 0.3-2.0 dl/g, and more preferably in a range of 0.35-1.5 dl/g.

The concentration of the polycarbonate resin contained in the curable resin composition of the present invention may be in a range of 0.5-50 mass %, preferably in a range of 1-50 mass %, more preferably in a range of 1-30 mass %, and still more preferably in a range of 5-30 mass % relative to the whole curable resin composition. As long as the amount of the polycarbonate resin in the curable resin composition is within the above-mentioned range, the balance among the solubility in the acrylic monomer, the casting property and the mechanical strength will be favorable, and the workability and the appearance of the cast molded article will be improved.

The curable resin composition of the present invention is a substantially transparent liquid composition (resin solution composition) in which the polycarbonate resin is dissolved in an acrylic monomer, and which further contains a radical polymerization initiator. The curable resin composition of the present invention may be a colored resin solution composition having a desirable dye or pigment dissolved or dispersed therein.

<Acrylic Monomer>

The acrylic monomer used for the curable resin composition of the present invention may be an acrylic monomer having a saturated group, and examples thereof include, but not limited to:

acrylate esters such as methyl acrylate, ethyl acrylate, propyl acrylate, butyl acrylate, hexyl acrylate, 2-ethylhexyl acrylate, cyclohexyl acrylate, benzyl acrylate, dimethylaminoethyl acrylate, hydroxyethyl acrylate, hydroxypropyl acrylate, and glycidyl acrylate;

methacrylate esters such as methyl methacrylate, ethyl methacrylate, propyl methacrylate, butyl methacrylate, hexyl methacrylate, 2-ethylhexyl methacrylate, cyclohexyl methacrylate, benzyl methacrylate, dimethylaminoethyl methacrylate, hydroxyethyl methacrylate, hydroxypropyl methacrylate and glycidyl methacrylate; and ethylenically unsaturated carboxylic acids such as monocarboxylic acids, including acrylic acid, methacrylic acid and crotonic acid.

Among these acrylic monomers, methyl methacrylate, ethyl methacrylate, methyl acrylate and ethyl acrylate are favorable, and methyl methacrylate is more favorable.

The concentration of the acrylic monomer contained in the curable resin composition of the present invention may be in a range of 99.5-50 mass %, preferably in a range of 99.1-50 mass %, more preferably in a range of 95-70 mass %, and still more preferably in a range of 85-70 mass %, relative to the whole curable resin composition.

<Radical Polymerization Initiator>

Furthermore, an additional monomer that can polymerize with the monomer and the modified unsaturated monomer can be used as a radical polymerization initiator.

Examples of the radical polymerization initiator include, but not limited to, azo compounds such as 2,2'-azobis(isobutyronitrile) (AIBN) and 2,2'-azobis(2,4-dimethylvaleronitrile), benzoyl peroxide, hydrogen peroxide, cumene hydroperoxide, tert-butyl hydroperoxide, di-tert-butyl peroxide, potassium persulfate, sodium persulfate and ammonium persulfate. One or more kinds of radical polymerization initiators may be used alone or in combination. Preferably, the amount of the radical polymerization initiator added is 0.001-5 mass %, preferably 0.005-3 mass % and more preferably 0.01-1 mass %, relative to the amount of the whole curable resin composition.

<Cast Molded Article and Method for Producing the Same>

The curable resin composition of the present invention can be cured directly by applying heat or light to give a transparent and strong cast molded article.

The curable resin composition of the present invention is capable of solvent-free bulk polymerization by dissolving the polycarbonate resin of the present invention in an acrylic monomer and adding a radical polymerization initiator thereto, and can easily give a cast molded article by a cell casting process or a continuous casting process. While the polymerization temperature for carrying out thermal curing can be determined freely, thermal curing is preferably carried out at a temperature below or equal to the boiling point of the acrylic monomer, preferably at 40-100° C., more preferably at 50-90° C., and still more preferably at 60-80° C.

While the polymerization time can be determined freely, it is 5 minutes to 48 hours, preferably 10 minutes to 30 hours and more preferably 30 minutes to 24 hours.

In a case of photocuring, curing is carried out by irradiation with light in a range of visible to UV light for a certain period of time. The wavelength of the irradiation light is 450-190 nm, preferably 400-200 nm, and more preferably 380-250 nm. The irradiation time is 1 second to 2 hours, preferably 3 seconds to 1 hour, and more preferably 5 seconds to 30 minutes, depending on the total radiance exposure. While the total radiance exposure can be determined freely according to the conditions, it is 50 mJ/cm$^2$-100 J/cm$^2$, preferably 100 mJ/cm$^2$-50 J/cm$^2$, and more preferably 300 mJ/cm$^2$-20 J/cm$^2$.

Alternatively, the curable resin composition can be put into water to allow polymerization curing by a suspension polymerization process. In this case, the above-described solvent can also be used in combination.

In one embodiment of the present invention, a curing method is provided which comprises applying heat or light to the curable resin composition.

In one embodiment of the present invention, a cast molded article is provided which is cured by the above-described curing method in a mold.

In one embodiment of the present invention, a method for producing a cast molded article is provided, which comprises curing the curable resin composition of the present invention in a mold.

In one embodiment of the present invention, a method for producing a cast molded article consisting of a grafted polycarbonate resin is provided, which comprises the steps of dissolving the polycarbonate resin of the present invention in an acrylic monomer, and adding a radical polymerization initiator thereto to allow grafting.

In one embodiment of the present invention, a cast molded article formed of the curable resin composition of the present invention is provided.

The cast molded article of the present invention may have a total light transmittance in a range of 80-100%, preferably in a range of 85-95%, more preferably in a range of 87-94%, and still more preferably in a range of 88-93%. The total light transmittance can be measured by a common method, for example, by using a commercially available haze meter (NDH4000 manufactured by Nippon Denshoku Industries Co., Ltd.). As long as the total light transmittance of the cast molded article lies within the above range, transparency sufficient as a substantially transparent part can be achieved.

The cast molded article of the present invention has impact strength (impact resistance) that is 1.1 times or more higher than that of a PMMA article molded in the same mold. While the impact strength can be determined freely, it may be in a range of 6.5-100 kJ/m$^2$, preferably in a range of 7.0-80 kJ/m$^2$, more preferably in a range of 8.0-50 kJ/m$^2$, and still more preferably in a range of 8.5-20 kJ/m$^2$. The impact strength can be measured by a common method, for example, by using a commercially available impact tester (impact tester IT manufactured by Toyo Seiki Seisaku-sho, Ltd.). As long as the impact strength of the cast molded article lies within the above range, a molded article that is less likely to break, thinner and stronger than PMMA can be obtained.

<Other Components>

For the purpose of adjusting the viscosity and else, any kind of solvent may be added to the curable resin solution of the present invention. Specific examples of solvents that can be added include, but not limited to:

halogenated organic solvents such as dichloromethane, 1,2-dichloroethane, chloroform and monochlorobenzene;

ester-based solvents such as methyl acetate, ethyl acetate, propyl acetate, butyl acetate, 2-ethoxy ethyl acetate, 2-methoxy-1-methylethyl acetate and ethyl lactate;

ketone-based solvents such as acetone, methyl ethyl ketone, methyl isobutyl ketone, cyclohexanone and isophorone;

carbonate ester-based solvents such as dimethyl carbonate and ethyl methyl carbonate;

ether-based solvents such as tetrahydrofuran, 1,4-dioxane, diethyl ether, dimethoxymethane, ethyl cellosolve and anisole; and aromatic hydrocarbon-based solvents such as toluene, ethylbenzene, xylene, pseudocumene and mesitylene.

In addition, an alcohol-based poor solvent such as ethanol or isopropyl alcohol, or a hydrocarbon-based poor solvent such as n-heptane, cyclohexane or mineral spirits may further be used in a small amount.

In order to enhance the color effect of the curable resin composition of the present invention, a pigment, a dye, color particles or particles with a light interfering property can be added. Examples of the pigment and the dye include organic pigments such as an azo pigment and a phthalocyanine pigment, specifically, for example, Red No. 104, Red No. 106, Red No. 201, Red No. 202, Red No. 204, Red No. 215, Red No. 220, Orange No. 203, Orange No. 204, Blue No. 1, Blue No. 404, Yellow No. 205, Yellow No. 401 and Yellow No. 405. Moreover, for imparting a white color, pearl color, metal color or lame appearance, mica titanium, titanium oxide, iron oxide, tin oxide, zirconium oxide, chromium oxide, bismuth oxychloride, silica, chromium, titanium nitride, titanium, magnesium fluoride, gold, silver, nickel or the like may also be used. The particles with a light interfering property refer to particles that enhance the color effect through light reflection or light scattering, where examples include glass beads, tiny seashells and mica. They are preferably added in an amount in a range of 0.0001-10.0 mass % relative to the amount of the curable resin composition as necessary.

Furthermore, a rust proofing agent, an antioxidant, a dispersant, a UV absorber, a defoaming agent, a leveling agent or the like can be added, as necessary.

<Physical Properties of Curable Resin Composition>

Because the polycarbonate resin of the curable resin composition of the present invention is completely dissolved in the acrylic monomer, there is no need of adding a solvent for dissolving the polycarbonate resin. Since the curable resin composition of the present invention does not lose a volume corresponding to a solvent, molding can be conducted by a casting process that is generally employed for acrylic resins.

While the solution viscosity of the curable resin composition of the present invention can be determined freely according to the intended casting process, it may be in a range of 1-20,000 mPa·s, preferably in a range of 2-10,000 mPa·s or in a range of 1-10,000 mPa·s, more preferably in a range of 2-6,000 mPa·s, still more preferably in a range of 3-5,000 mPa·s, and yet still more preferably in a range of 4-4,000 mPa·s. As long as the solution viscosity of the curable resin composition lies within the above range, the handling property will be favorable.

EXAMPLES

Hereinafter, examples of the present invention will be described along with comparative examples to describe the invention in detail, although the present invention is not limited to these examples.

<Solvent Solubility>

Polycarbonate resins of the examples and the comparative examples were each dissolved in a 5-30 mass % methyl methacrylate. After 24 hours of shaking the solution in a sealed container using a shaker, presence of undissolved residue was visually confirmed. ○ indicates that undissolved residue was not present while x indicates that undissolved residue was present.

<Method for Measuring Intrinsic Viscosity>

Intrinsic viscosity of a 0.5 mass/volume % dichloromethane solution of the polycarbonate resin was measured using an Ubbelohde capillary viscometer at a temperature of 20° C. and a Huggins constant of 0.45.

<Method for Measuring Viscosity of Curable Resin Composition>

Viscosity of the curable resin composition was measured at 25° C. using a vibration viscometer (CJV5000 manufactured by A&D Company, Ltd.).

<Measurement of Total Light Transmittance of Cast Molded Article>

Total light transmittance of a molded article of the curable resin composition, having a diameter of 53 mm and a thickness of 0.5 mm, was measured using a commercially available haze meter (NDH4000 manufactured by Nippon Denshoku Industries Co., Ltd.).

<Test for Impact Resistance (Impact Strength) of Molded Article>

A cylindrical molded article of the curable resin composition, having an inner diameter of about 4.4 mm and a height of about 30 mm, was subjected to measurement using a commercially available impact tester (impact tester IT manufactured by Toyo Seiki Seisaku-sho, Ltd.) by securing the molded article to an originally made jig and performing the measurement under the conditions including an izod 2 J weight and a swinging angle of 150°.

Example 1

In 1,100 ml of a 5 mass/mass % aqueous sodium hydroxide solution, 108 g (0.4 mol) of 2,2-bis(4-hydroxyphenyl)-4-methylpentane (hereinafter, simply referred to as "MIBK": manufactured by Honshu Chemical Industry Co., Ltd.) and 0.2 g of hydrosulfite were dissolved.

To this, 400 ml of methylene chloride was added and 60 g of phosgene was further blown into the resultant for about 60 minutes while stirring and maintaining the temperature at 15-20° C.

At the end of phosgene blowing, 4.3 g (0.0133 mol) of 2-[2-hydroxy-5-[2-(methacryloyloxy)ethyl]phenyl]-2H-benzotriazole (hereinafter, simply referred to as "MBZT": manufactured by Otsuka Chemical Co., Ltd.) and 100 ml of a 10 mass/mass % aqueous sodium hydroxide solution were added and vigorously stirred to emulsify the reaction solution. Following emulsification, 0.4 ml of triethylamine was added to the resultant to allow polymerization by stirring at 20-30° C. for about 40 minutes.

At the end of polymerization, the reaction solution was separated into an aqueous phase and an organic phase. The organic phase was neutralized with phosphoric acid, and repeatedly washed with water until the conductivity of the rinsing liquid (aqueous phase) became 10 μS/cm or lower. The obtained polymer solution was dropped into warm water that was kept at 60° C. to evaporate the solvent away, thereby obtaining a white powdery precipitate. The obtained precipitate was filtered and dried at 110° C. for 24 hours, thereby obtaining polymer powder.

The intrinsic viscosity of a 0.5 g/dl solution of the resulting polymer using methylene chloride as a solvent was 0.51 dl/g at 20° C. The obtained polymer was analyzed by infrared spectroscopy. As a result, absorption by a carbonyl group around 1770 $cm^{-1}$, and absorption by an ether bond around 1240 $cm^{-1}$ were observed, confirming that it was a polycarbonate resin having a carbonate bond (hereinafter, simply referred to as "PC-1").

3 parts by mass of the obtained PC-1 was dissolved in 17 parts by mass of methyl methacrylate (hereinafter, simply referred to as "MMA": manufactured by FUJIFILM Wako Pure Chemical Corporation) (i.e., an acrylic monomer having a saturated group) which was obtained by removing the polymerization inhibitor with a 5 mass/mass % aqueous sodium hydroxide solution and then dehydrating with anhydrous sodium sulfate. After PC-1 was completely dissolved, 0.01 parts by mass of azobis(isobutyronitrile) was added and dissolved therein as a radical polymerization initiator to give a curable resin solution composition. 1.3 g of this curable resin solution composition was put into a cylindrical glass mold having an inner diameter of 53 mm, which was then tightly sealed and immersed in a hot water bath at 70° C. for 24 hours to allow curing, thereby obtaining a 0.5 mm-thick cast molded article. The total light transmittance of the obtained molded article was measured to be 89.0%. In addition, the curable resin solution composition was similarly put into a cylindrical glass tube having an inner diameter of 4.4 mm and a height of 30 mm and cured under the same conditions to give a cast molded article. The impact strength of the obtained molded article was measured using a tensile testing machine.

Example 2

Polymerization was carried out in the same manner as Example 1 except that 96.8 g of 1,1-bis(4-hydroxyphenyl)-2-methylpropane (hereinafter, simply referred to as "IBTD": manufactured by Honshu Chemical Industry Co., Ltd.) was used instead of MIBK to give a polycarbonate resin (intrinsic viscosity: 0.54 dl/g, hereinafter, simply referred to as "PC-2"). The obtained PC-2 was used in the same manner as Example 1 to prepare a curable resin solution composition, which was also cured to obtain cast molded articles for measuring the total light transmittance and the impact strength in the same manner.

Example 3

Polymerization was carried out in the same manner as Example 1 except that 119.2 g of 1,1-bis(4-hydroxyphenyl)-2-ethylhexane (hereinafter, simply referred to as "IOTD": manufactured by Honshu Chemical Industry Co., Ltd.) was used instead of MIBK to give a polycarbonate resin (intrinsic viscosity: 0.51 dl/g, hereinafter, simply referred to as "PC-3"). The obtained PC-3 was used in the same manner as Example 1 to prepare a curable resin solution composition, which was also cured to obtain cast molded articles for measuring the total light transmittance and the impact strength in the same manner.

Example 4

Polymerization was carried out in the same manner as Example 1 except that 1.78 g of p-isopropenylphenol (hereinafter, simply referred to as "IPP" manufactured by Mitsui Chemicals Inc.) was used instead of MBZT to give a polycarbonate resin (intrinsic viscosity: 0.59 dl/g, hereinafter, simply referred to as "PC-4"). The obtained PC-4 was used in the same manner as Example 1 to prepare a curable resin solution composition, which was also cured to obtain cast molded articles for measuring the total light transmittance and the impact strength in the same manner.

Example 5

Polymerization was carried out in the same manner as Example 1 except that 72.6 g of IBTD and 22.8 g of 2,2-bis(4-hydroxyphenyl)propane (hereinafter, simply referred to as "BPA": manufactured by Mitsubishi Chemical Corporation) were used instead of MIBK and that 1.62 g of MBZT was used to give a polycarbonate resin (intrinsic viscosity: 0.96 dl/g, hereinafter, simply referred to as "PC-5"). The obtained PC-5 was used in the same manner as Example 1 to prepare a curable resin solution composition, which was also cured to obtain cast molded articles for measuring the total light transmittance and the impact strength in the same manner.

Example 6

Polymerization was carried out in the same manner as Example 1 except that the amount of MIBK was changed to 81 g, that 24.2 g of 2,2-bis(4-hydroxyphenyl)butane (hereinafter, simply referred to as "BPB" manufactured by Honshu Chemical Industry Co., Ltd.) was used and that the amount of MBZT was changed to 7.17 g to give a polycarbonate resin (intrinsic viscosity: 0.36 dl/g, hereinafter, simply referred to as "PC-6"). The obtained PC-6 was used in the same manner as Example 1 to prepare a curable resin solution composition, which was cured to obtain a cast molded article. The total light transmittance and the impact strength were also measured in the same manner.

Example 7

A curable resin solution composition was prepared and cured in the same manner as Example 1 except that the amount of PC-1 was changed to 1 part by mass and that the amount of MMA was changed to 19 parts by mass, thereby obtaining cast molded articles for measuring the total light transmittance and the impact strength in the same manner.

Example 8

A curable resin solution composition was prepared and cured in the same manner as Example 1 except that the amount of PC-1 was changed to 6 parts by mass and that the amount of MMA was changed to 14 parts by mass, thereby obtaining cast molded articles for measuring the total light transmittance and the impact strength in the same manner.

Comparative Example 1

Polymerization was carried out in the same manner as Example 1 except that 2.0 g of p-tert-butylphenol (hereinafter, simply referred to as "PTBP": manufactured by DIC Corporation) was used instead of MBZT to give a polycarbonate resin (intrinsic viscosity: 0.49 dl/g, hereinafter, simply referred to as "PC-7"). The obtained PC-7 was used in the same manner as Example 1 to prepare a curable resin solution composition, which was also cured to obtain cast molded articles for measuring the total light transmittance and the impact strength in the same manner.

Comparative Example 2

Polymerization was carried out in the same manner as Example 1 except that 91.2 g of BPA was used instead of MIBK and that 2.0 g of PTBP was used instead of MBZT to obtain a polycarbonate resin (intrinsic viscosity: 0.50 dl/g, hereinafter, simply referred to as "PC-8"). The obtained PC-8 was used in the same manner as Example 1 in an attempt to prepare a curable resin solution composition but it did not dissolve in MMA, and the resulting cast molded articles were cloudy. The total light transmittance and the impact strength of the cast molded articles were measured in the same manner as Example 1.

Comparative Example 3

A curable resin solution composition was prepared and cured in the same manner as Example 1 except that PC-1 was not used at all and only MMA was cured, thereby obtaining cast molded articles. The total light transmittance and the impact strength of the cast molded article were measured in the same manner as Example 1.

For each of Examples 1-8 and Comparative examples 1-3, solubility in the acrylic, intrinsic viscosity of the polycarbonate resin, solution viscosity of the curable resin composition, total light transmittance of the cast molded article, and impact strength of the cast molded article were evaluated and the results thereof are shown in Table 1 below.

TABLE 1

| Examples/ Comparative examples | Terminal structure | Kind of PC | Kind of PC monomer | Solubility in acrylic | Amount of PC added (mass %) | Intrinsic viscosity (dL/g) | Solution viscosity (Pa · s) | Total light transmittance (%) | Impact strength (kJ/m²) |
|---|---|---|---|---|---|---|---|---|---|
| Example 1 | MBZT | PC-1 | MIBK | ○ | 15 | 0.51 | 92 | 89.0 | 9.4 |
| Example 2 | MBZT | PC-2 | IBTD | ○ | 15 | 0.54 | 115 | 90.2 | 9.3 |
| Example 3 | MBZT | PC-3 | IOTD | ○ | 15 | 0.51 | 62 | 89.4 | 8.9 |
| Example 4 | IPP | PC-4 | MIBK | ○ | 15 | 0.59 | 158 | 88.8 | 9.5 |
| Example 5 | MBZT | PC-5 | IBTD/BPA | ○ | 15 | 0.92 | 949 | 89.3 | 9.3 |
| Example 6 | MBZT | PC-6 | MIBK/BPB | ○ | 15 | 0.36 | 39 | 88.5 | 9.5 |
| Example 7 | MBZT | PC-1 | MIBK | ○ | 5 | 0.51 | 4.1 | 89.1 | 7.0 |
| Example 8 | MBZT | PC-1 | MIBK | ○ | 30 | 0.51 | 3259 | 88.7 | 11.3 |
| Comparative example 1 | PTBP | PC-7 | MIBK | ○ | 15 | 0.49 | 74 | 77.8 | 8.4 |
| Comparative example 2 | PTBP | PC-8 | BPA | x | 15 | 0.5 | 0.9 | 2.3 | 6.4 |
| Comparative example 3 | — | — | Acrylic | — | 0 | — | 0.6 | 91.0 | 6.4 |

Exemplary applications of the present invention include a use as a modifier to an acrylic resin. Specifically, the present invention can be applied to usages that require transparency and strength, such as resin glass, glass alternatives for car windows, aquarium tanks, light guide plates, various kinds of lenses, hard coats and paintings.

The invention claimed is:

1. A curable resin composition comprising:
an acrylic monomer having a saturated group;
a polycarbonate resin containing Structural unit (2) below which has a terminal structure represented by Structural formula (1) below with an unsaturated group attached to the end of the molecule; and
a radical polymerization initiator:

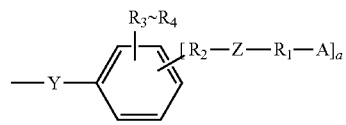

(1)

(in Formula (1)),
A represents a vinyl group, an isopropenyl group, a styryl group or a methine group,
$R_1$-$R_2$ each independently represent a single bond or an optionally substituted C1-C20 alkylene group,
$R_3$-$R_4$ each independently represent hydrogen, or an optionally substituted C1-C20 alkyl group, C1-C10 alkoxy group, C6-C12 aryl group or benzotriazole group,
Z represents an ether group, a carbonyl group, an ester group or a single bond,
a is an integer of 1-3, and
Y represents an ether bond or an ester group); and

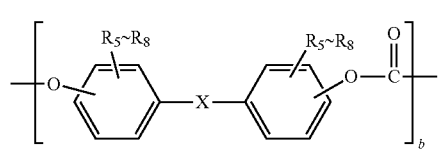

(2)

(in Formula (2),
$R_5$-$R_8$ each independently represent hydrogen, or an optionally substituted C1-C20 alkyl group, C6-C12 aryl group, C1-C5 alkoxy group or C7-C17 aralkyl group,
b is an integer of 1 or greater,
X is as follows:

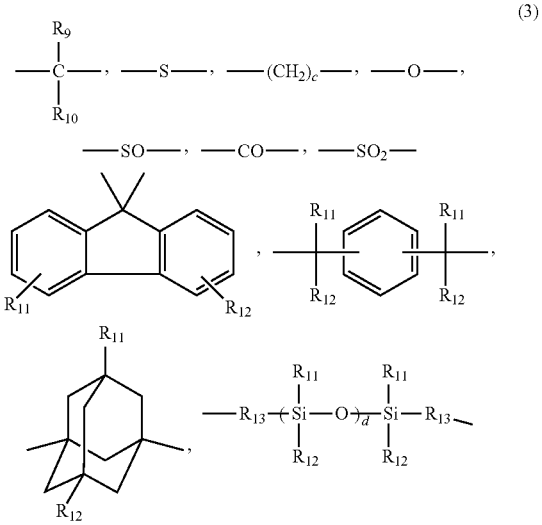

(3)

wherein,
$R_9$ and $R_{10}$ each independently represent hydrogen, fluorine, chlorine, bromine or iodine, or an optionally substituted C1-C20 alkyl group, C1-C5 alkoxy group or C6-C12 aryl group, or $R_9$ and $R_{10}$ bind to each other and represent a group forming a C5-C20 carbocyclic ring or a heterocyclic ring having 5-12 elements,
$R_{11}$ and $R_{12}$ each independently represent hydrogen, fluorine, chlorine, bromine or iodine, or an optionally substituted C1-C9 alkyl group, C1-C5 alkoxy group or C6-C12 aryl group,
$R_{13}$ is an optionally substituted C1-C9 alkylene group,
c represents an integer of 0-20, and
d represents an integer of 1-500,
provided that the composition further comprises a second polycarbonate resin if $R_5$-$R_8$ are hydrogen and $R_9$ and $R_{10}$ are methyl groups), wherein the concentration of the acrylic monomer contained in the curable resin composition is in a range of 95-70 mass %, relative to the whole curable resin composition.

2. The curable resin composition according to claim 1, wherein Structural unit (2) is any one or more kinds selected from the group consisting of Formulae (4) to (7) below:

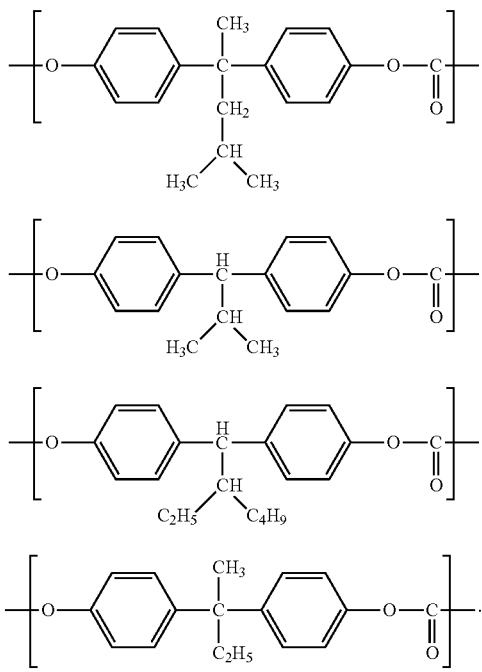

3. The curable resin composition according to claim 1, wherein Structural unit (2) is derived from a bisphenol compound.

4. The curable resin composition according to claim 3, wherein at least one kind of bisphenol compound is selected from the group consisting of 2,2-bis(4-hydroxyphenyl) butane, 1,1-bis(4-hydroxyphenyl)-2-methylpropane, 1,1-bis (4-hydroxyphenyl)-2-ethylhexane and 2,2-bis(4-hydroxyphenyl)-4-methylpentane.

5. The curable resin composition according to claim 1, wherein, in Formula (1) above, Z is a single bond or an ester group, $R_1$-$R_2$ are each independently a single bond or an ethylene group, A is an isopropenyl group or a methine group, and $R_3$-$R_4$ are each independently hydrogen or a benzotriazole group.

6. The curable resin composition according to claim 5, wherein the terminal structure represented by Formula (1) above is a monohydric phenol derived from 2-[2-hydroxy-5-[2-(methacryloyloxy)ethyl]phenyl]-2H-benzotriazole or p-isopropenylphenol.

7. The curable resin composition according to claim 1, wherein the acrylic monomer comprises an acrylate ester or a methacrylate ester.

8. The curable resin composition according to claim 1, wherein the acrylic monomer comprises a methyl methacrylate.

9. The curable resin composition according to claim 1, wherein the polycarbonate resin has an intrinsic viscosity of 0.3-2.0 dl/g.

10. The curable resin composition according to claim 1, comprising the terminal structure represented by Structural formula (1) in an amount of 0.2 mol % or more relative to the amount of Structural unit (2) above.

11. A curing method comprising curing the curable resin composition according to claim 1 by applying heat or light thereto.

12. A cast molded article put and cured in a mold by the curing method according to claim 11.

13. A method for producing a cast molded article, the method comprising putting and curing the curable resin composition according to claim 1 in a mold.

14. A cast molded article, which is formed of the curable resin composition according to claim 1.

* * * * *